Jan. 30, 1940.  L. BERTELE  2,188,523
PHOTOGRAPHIC OBJECTIVE
Filed Sept. 14, 1938
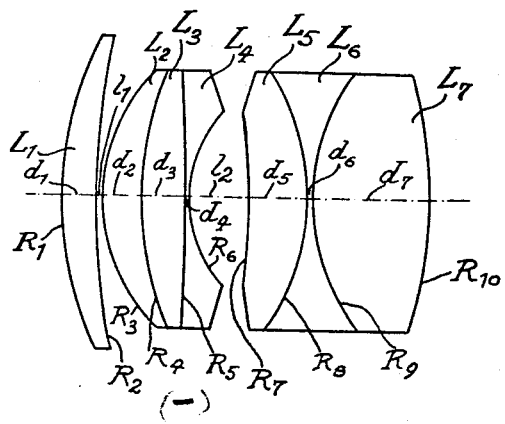
INVENTOR.
Ludwig Bertele
BY B. Singer & F. Stern
ATTORNEYS Patented Jan. 30, 1940

2,188,523

UNITED STATES PATENT OFFICE 2,188,523

PHOTOGRAPHIC OBJECTIVE

Ludwig Bertele, Dresden-Tolkewitz, Germany, assignor to Zeiss Ikon Aktiengesellschaft, Dresden, Germany Application September 14, 1938, Serial No. 229,819
In Germany January 8, 1938

3 Claims. (Cl. 88—57)

The invention relates to improvements in photographic objectives having a relatively large aperture, and in particular is directed to that type of objective comprising at least two collective members surrounded by air and between which is positioned a meniscus shaped member curved toward the front member.

Objectives of this type, comprising a collective front member, a meniscus-shaped center member and a collective rear member separated from each other by air, are especially suitable for obtaining relatively large apertures, since it is possible to eliminate to a very large extent all picture errors with the least number of reflective surfaces. It is necessary, however, that some of the members be composed of a number of lenses cemented together.

It is the object of the present invention to increase the high quality of an objective of this type, which according to extensive investigations is possible, if the rear member of the objective is composed of a number of lenses of predetermined characteristics, all cemented together.

In accordance with the invention the rear member of the objective is composed of three lenses, of which the center lens is a bi-concave dispersive lens made of a refractive medium whose refractive index is smaller than the refractive indices of the lens mediums which are cemented to the bi-concave lens.

The drawing illustrates diagrammatically the outline of the axial cross section of an objective in accordance with the present invention.

According to the drawing, the objective consists of three members in axial alinement and separated by air, the axial separating distances being designated with $l_1$ and $l_2$ respectively. The front member, which faces the object to be photographed, is a single collective lens $L_1$ $(d_1)$. The center member is a three-lens meniscus composed of the lenses $L_2$ $(d_2)$, $L_3$ $(d_3)$ and $L_4$ $(d_4)$, the convex face $R_3$ of this member being directed toward the front member $L_1$ $(d_1)$. The rear member is composed of three lenses $L_5$ $(d_5)$, $L_6$ $(d_6)$ and $L_7$ $(d_7)$ all cemented together. The center lens $L_6$ $(d_6)$ of this rear member is a bi-concave dispersive lens. The lenses $L_5$ $(d_5)$ and $L_7$ $(d_7)$ in accordance with the present invention, are made of refractive mediums whose refractive indices are larger than the refractive index of the refractive medium the dispersive lens $L_6$ $(d_6)$ is made of.

This novel composition of the rear member of the objective permits a still further elimination of picture errors as heretofore was obtainable, without a decrease in the relative large aperture. It is, however, also possible to increase the relative large aperture of the objective without changing the picture errors which may be present.

In the following the optical data are given, by way of example, for a photographic objective having a focal $f=100$ mm. and an aperture 1:2.

|  |  |  | $nd$ | $v$ |
|---|---|---|---|---|
| $L_1$ | $R_1 = + 68{,}41$ | $d_1 = 6{,}87$ | 1,6200 | 60,3 |
|  | $R_2 = +384{,}32$ | $l_1 = 0{,}38$ |  |  |
| $L_2$ | $R_3 = + 34{,}35$ | $d_2 = 7{,}25$ | 1,7015 | 41,2 |
| $L_3$ | $R_4 = + 63{,}93$ | $d_3 = 7{,}63$ | 1,5487 | 45,8 |
| $L_4$ | $R_5 = -362{,}56$ | $d_4 = 1{,}91$ | 1,6883 | 30,0 |
|  | $R_6 = + 24{,}29$ | $l_2 = 9{,}54$ |  |  |
|  | $R_7 = -128{,}80$ |  |  |  |
| $L_5$ | $R_8 = - 44{,}84$ | $d_5 = 10{,}88$ | 1,6200 | 60,3 |
| $L_6$ |  | $d_6 = 1{,}15$ | 1,5150 | 50,0 |
|  | $R_9 = + 41{,}79$ |  |  |  |
| $L_7$ | $R_{10} = - 88{,}43$ | $d_7 = 22{,}52$ | 1,6682 | 48,8 |

What I claim is:

1. A photographic objective, consisting of at least two axially alined collective members surrounded by air and a member between the same forming a meniscus curved toward that collective member facing the object to be photographed, the other collective member being formed of three lenses all cemented together, the center lens of said last named collective member being a bi-concave lens mounted between a concavo-convex lens and a bi-convex lens, said last named two lenses made of refractive mediums having higher refractive indices than the refractive medium of which said bi-concave lens is made, said concavo-convex lens facing said meniscus member.

2. A photographic objective, consisting of at least two axially alined collective members and a member between the same and separated from the same by air and forming a meniscus curved toward that collective member facing the object to be photographed, the other collective member being formed of three lenses all cemented together, the center lens of said last named collective member being a bi-concave lens whose concave faces have substantially the same radius of curvature and the two exterior lenses of said last named collective member being made of refractive mediums having higher refractive indices than the refractive medium of which said bi-concave lens is made, one of said two exterior lenses being a concavo-convex lens, the concave face of which facing said meniscus member.

3. A photographic objective consisting of three members in axial alignment separated by air, the front member being a single collective lens, the center member being a three-lens meniscus the concave face of which faces said front member, and the rear member being composed of a concavo-convex lens, a bi-concave lens and a bi-convex lens, all cemented together in the order named to form a collective lens unit whose outer concave face is directed toward said center member, the concave faces of said bi-concave lens having substantially the same radius of curvature and the two lenses cemented to said bi-concave lens being made of refractive mediums having different refractive indices which are larger than the refractive index of the medium of which said bi-concave lens is made.

LUDWIG BERTELE.